United States Patent [19]
Shirota et al.

[11] Patent Number: 5,948,576
[45] Date of Patent: Sep. 7, 1999

[54] PROCESS FOR PRODUCING A COLOR FILTER

[75] Inventors: Katsuhiro Shirota, Inagi; Hiroshi Sato, Yokohama; Makoto Akahira, Kawasaki; Hideto Yokoi, Yokohama; Takeshi Miyazaki, Ebina; Akio Kashiwazaki, Yokohama; Shoji Shiba, Sagamihara, all of Japan

[73] Assignee: Canon Kabushiki Kaisha, Tokyo, Japan

[21] Appl. No.: 08/857,175

[22] Filed: May 15, 1997

Related U.S. Application Data

[62] Division of application No. 08/377,783, Jan. 24, 1995.

[30] Foreign Application Priority Data

| Jan. 28, 1994 | [JP] | Japan | 6-008178 |
| Dec. 21, 1994 | [JP] | Japan | 6-318318 |
| Dec. 21, 1994 | [JP] | Japan | 6-318322 |

[51] Int. Cl.$^6$ ............................. G02B 5/20; G02F 1/1335
[52] U.S. Cl. .......................... 430/7; 347/106; 427/492; 427/493; 427/511; 427/164
[58] Field of Search .................... 430/7; 347/106; 349/106; 427/492, 493, 511, 512, 558, 559, 164, 165, 261

[56] References Cited

U.S. PATENT DOCUMENTS

| 4,313,124 | 1/1982 | Hara . |
| 4,345,262 | 8/1982 | Shirato et al. . |
| 4,418,284 | 11/1983 | Ogawa et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,698,113 | 10/1987 | Ogawa ............................. 156/275.7 |
| 4,723,129 | 2/1988 | Endo et al. . |
| 4,740,796 | 4/1988 | Endo et al. . |
| 4,818,075 | 4/1989 | Takao et al. . |
| 4,846,556 | 7/1989 | Haneda . |
| 4,864,324 | 9/1989 | Shirota et al. . |
| 4,965,612 | 10/1990 | Sakaki et al. . |

(List continued on next page.)

FOREIGN PATENT DOCUMENTS

| 0400738 | 12/1990 | European Pat. Off. . |
| 0552035 | 7/1993 | European Pat. Off. . |
| 54-56847 | 5/1979 | Japan . |
| 01235903 | 9/1982 | Japan . |
| 59-075205 | 4/1984 | Japan . |
| 59-123670 | 7/1984 | Japan . |
| 59-138461 | 8/1984 | Japan . |
| 60-71260 | 4/1985 | Japan . |
| 61-77014 | 4/1986 | Japan . |
| 62-254103 | 11/1987 | Japan . |
| 63-235901 | 9/1988 | Japan . |
| 63-294503 | 12/1988 | Japan . |
| 01217302 | 8/1989 | Japan . |
| 01217320 | 8/1989 | Japan . |
| 02228605 | 9/1990 | Japan . |
| 03010220 | 1/1991 | Japan . |
| 04123005 | 4/1992 | Japan . |
| 04317007 | 11/1992 | Japan . |
| 04349401 | 12/1992 | Japan . |
| 5-93808 | 4/1993 | Japan . |
| 05142407 | 6/1993 | Japan . |
| 05173010 | 7/1993 | Japan . |
| 05241012 | 9/1993 | Japan . |
| 05288913 | 11/1993 | Japan . |
| WO 93 24240 | 12/1993 | WIPO . |

*Primary Examiner*—John A. McPherson
*Attorney, Agent, or Firm*—Fitzpatrick, Cella, Harper & Scinto

[57] ABSTRACT

Disclosed herein is a color filter equipped with a plurality of colored light-transmitting areas on its base, wherein the light-transmitting areas are colored with ink dots, and each of the colored portions is continuously formed over a plurality of the light-transmitting areas.

13 Claims, 11 Drawing Sheets

U.S. PATENT DOCUMENTS

| | | |
|---|---|---|
| 4,981,614 | 1/1991 | Miyazaki et al. . |
| 4,995,705 | 2/1991 | Yoshinaga et al. . |
| 5,011,623 | 4/1991 | Yoshinaga et al. . |
| 5,039,208 | 8/1991 | Ohnishi et al. . |
| 5,079,214 | 1/1992 | Long et al. . |
| 5,190,794 | 3/1993 | Yoshino et al. ................. 427/162 |
| 5,278,009 | 1/1994 | Iida et al. ................. 430/7 |
| 5,281,450 | 1/1994 | Yaniv ................. 427/510 |
| 5,317,434 | 5/1994 | Ohara ................. 359/68 |
| 5,340,619 | 8/1994 | Chen et al. . |
| 5,358,558 | 10/1994 | Yamamoto et al. . |
| 5,418,094 | 5/1995 | Sato et al. ................. 430/7 |
| 5,420,708 | 5/1995 | Yokoyama et al. . |
| 5,552,192 | 9/1996 | Kashiwazaki et al. . |
| 5,570,120 | 10/1996 | Sasaki et al. . |
| 5,593,757 | 1/1997 | Kashiwazaki et al. . |
| 5,614,007 | 3/1997 | Kurabayashi et al. . |
| 5,716,740 | 2/1998 | Shiba et al. ................. 430/7 |

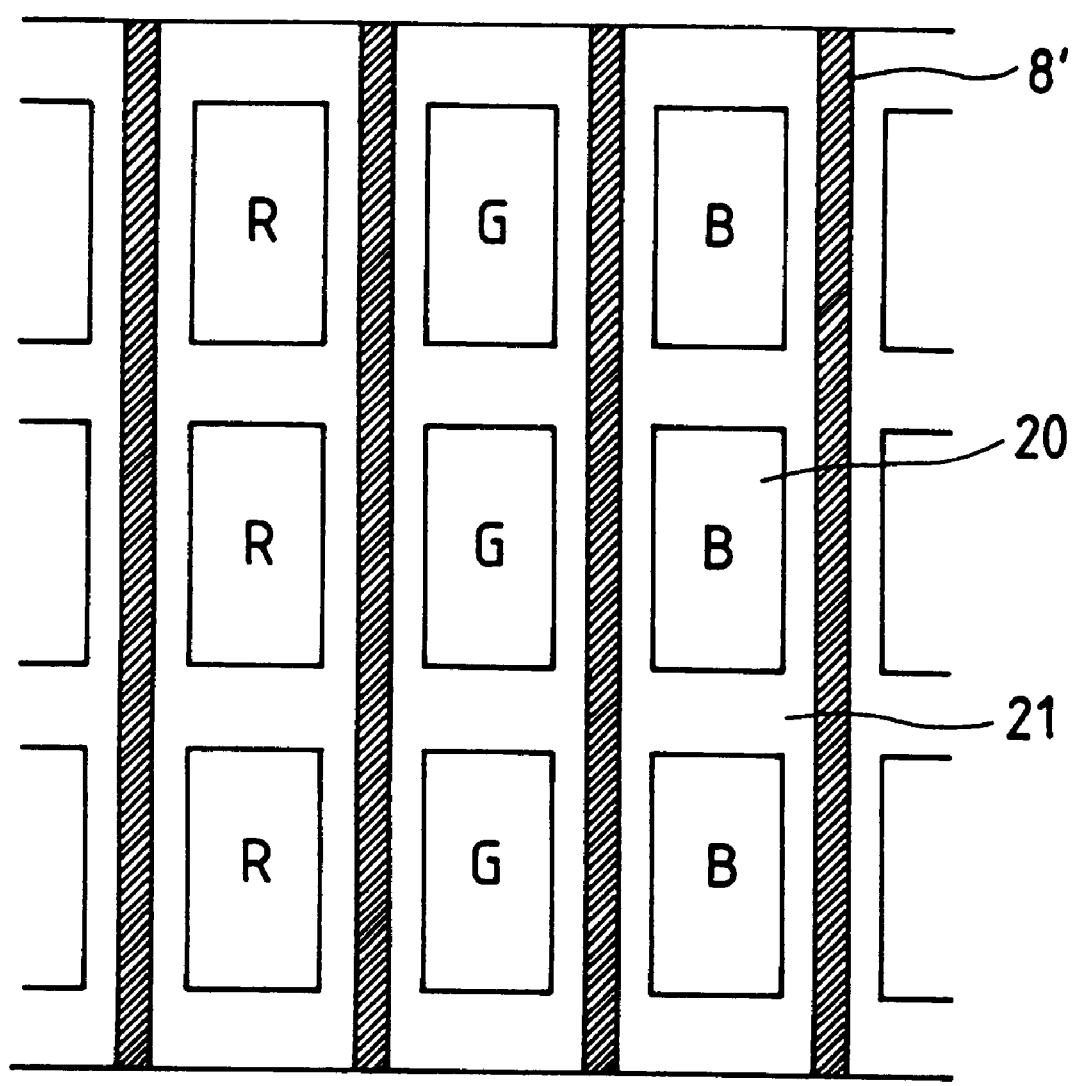

PROCESS FOR PRODUCING A COLOR FILTER

This application is a division of application Ser. No. 08/377,783, pending filed Jan. 24, 1995.

BACKGROUND OF THE INVENTION

1. Field of the Invention

The present invention relates to a color filter suitable for use in color liquid crystal displays used in color televisions, personal computers, and the like, a production process thereof, and a liquid crystal panel, and particularly to a production process of a color filter for liquid crystals making good use of an ink-jet recording technique. The present invention also relates to a color filter for liquid crystals, which is produced by using the ink-jet recording technique, and a liquid crystal panel equipped with the color filter.

2. Related Background Art

With the advancement of personal computers, particularly, portable personal computers in recent years, the demand for liquid crystal displays, particularly, color liquid crystal displays tends to increase. It is however necessary to reduce the cost of the color liquid crystal displays for further spreading them. There is an increasing demand for reduction in the cost of color filters particularly given much weight from the viewpoint of the cost.

Various methods have heretofore been attempted for meeting above demand while satisfying properties required of the color filters. However, no method satisfying all the required properties is yet established. The individual methods will hereinafter be described.

The first method oftenest used is a dyeing process. In the dyeing process, a sensitizing agent is added to a water-soluble polymeric material, which is a material for dyeing, to sensitize the polymeric material. The thus-sensitized polymeric material is applied on a glass base. After the coating film thus formed is patterned in the desired form by a photolithography process, the glass base on which the coating film has been patterned is immersed in a dye bath to obtain a colored pattern. This process is repeatedly performed three times to form colored layers of red (R), green (G) and blue (B).

The second method oftener used is a pigment dispersing process which has been replacing the dyeing process in recent years. In this process, a layer of a photosensitive resin in which a pigment has been dispersed is first formed on a base and then subjected to patterning, thereby obtaining a pattern of a single color. This process is repeatedly performed three times to form three colored layers of R, G and B.

As the third method, there is an electrodepostion process. In this process, a transparent electrode is first patterned on a base. The base is then immersed in an electrodeposition coating fluid containing a pigment, resin, electrolytic solution and the like to electrically deposit the first color. This process is repeatedly performed three times to form colored layers of R, G and B. Finally, the colored layers are calcined.

As the fourth method, there is a printing process in which three coatings of red, green and blue colors, each comprising a thermosetting resin and a pigment dispersed therein, are separately coated by repeated printing, and the resin to become a colored layer is then thermoset to form the colored layers. It is general to form a protective layer on the outermost colored layer in each process.

The need of repeating the same process three times to form the colored layers of R, G and B is common to these processes. Therefore, the cost is necessarily increased. There is also offered a problem that a yield is reduced as the number of processes increases.

In the third process by the electrodeposition, besides, formable patterns are limited. It is hence difficult to apply this process to a TFT color liquid crystal display in the existing technique. The fourth process involves a drawback that resolution and smoothness are poor, and is hence unfit to form a fine-pitch pattern.

In order to improve these drawbacks, Japanese Patent Application Laid-Open Nos. 59-75205, 63-235901, 1-217302 and 4-123005 each describe processes for producing a color filter by using an ink-jet system.

These processes are different from the above-described conventional processes. In these processes, coloring solutions (hereinafter referred to as inks) separately containing coloring matters of R, G and B are jetted out from respective nozzles on a filter base, and the inks are dried on the filter base to form colored layers. According to these processes, the formation of the individual colored layers of R, G and B can be performed at once, and moreover the amount of the inks to be used is saved. Therefore, they have effects of enhancing productivity to a great extent and reducing the cost.

However, these conventional processes have involved a major problem in technique that since pixels are formed by jetting out droplets of the liquid inks, it is difficult to apply the ink droplets to the desired positions of ink-droplet impact, for example, in the vicinity of the centers of the respective pixels of R, G and B, with precision, and so a problem of positional deviation in ink dots is easy to arise. When such positional deviation in ink dots occurs, a so-called blank area-shining phenomenon (a phenomenon that a transparent base looks brightly shining at its exposed position) occurs at a portion of a light-transmitting area, which is covered with no colored layer. Therefore, the definition of an image formed through the resulting color filter is reduced to a great extent. There is thus a demand for rapid establishment of a method for solving such a problem.

Japanese Patent Application Laid-Open No. 5-142407 describes a process for forming a color filter, in which pixel-forming materials are flowed in the form of a fluid out of minute nozzles, as a technique of concurrent multicolor printing. In such a process, however, colored stripes to be formed from the pixel-forming materials are continuously flowed out of the minute nozzles, so that the width and thickness of the colored stripe are varied according to variation in the outflow rate. In particular, when the variation in the outflow rate is wide, the colored stripe is torn off in the course of the outflow, so that the above-described blank area-shining phenomenon occurs. In order to prevent the tearing of the colored stripe, this method requires to lower the outflow rate of the pixel-forming material, so that the productivity also becomes poor.

SUMMARY OF THE INVENTION

It is accordingly an object of the present invention to provide a color filter having brightly colored light-transmitting areas free of the occurrence of a blank area-shining phenomenon due to the deviated ink-droplet impact even when the color filter is formed by an ink-jet recording method, and a production process thereof.

Another object of the present invention is to provide a production process of a color filter, which satisfies both required properties met by the conventional processes, such as heat resistance, solvent resistance and resolution, and ink-jet recordability, and moreover permits the shortening of processes to reduce its cost, a color filter produced by this process and having high reliability, and a liquid crystal panel equipped with the color filter.

The above objects can be achieved by the present invention described below.

According to the present invention, there is thus provided a color filter equipped with a plurality of colored light-transmitting areas on its base, wherein the light-transmitting areas are colored with ink dots, and each of the colored portions is continuously formed over a plurality of the light-transmitting areas.

According to the present invention, there is also provided a process for producing a color filter by ejecting droplets of an ink from an orifice by an ink-jet system to apply a colorant onto a base having light-transmitting areas, thereby coloring the light-transmitting areas, which comprises applying the ink droplets in such a manner that a colored portion is continuously formed over a plurality of the light-transmitting areas.

According to the present invention, there is further provided a process for producing a color filter by ejecting droplets of an ink from an orifice by an ink-jet system to apply a colorant onto a base having light-transmitting areas, thereby coloring the light-transmitting areas, which comprises the steps of applying a hydrophilic polymeric compound onto the base, and applying the ink droplets onto the base to continuously form a colored portion over a plurality of the light-transmitting areas.

According to the present invention, there is still further provided a color filter provided with colored portions separately colored in red, green and blue colors in the form of stripes, wherein color mixing-preventing walls are provided between the colored portions of different colors.

According to the present invention, there is yet still further provided a process for producing a color filter by ejecting inks using an ink-jet system to separately color a base in red, green and blue colors in the form of stripes, which comprises the steps of:

(1) forming a layer of a resin composition, the wettability by ink and/or the ink absorptivity of which is lowered at its light-exposed portions by a light irradiation treatment or light irradiation and heat treatments, on the base;

(2) subjecting the resin layer to patterned exposure in the form of stripes or a matrix;

(3) ejecting the inks using the ink-jet system to separately color unexposed portions of the resin layer in red, green and blue colors; and (4) setting the colored portions of the resin layer by the irradiation and/or the heat treatment.

According to the present invention, there is yet still further provided a process for producing a color filter by ejecting inks using an ink-jet system to separately color a base in red, green and blue colors in the form of stripes, which comprises the steps of:

(1) forming a layer of a resin composition, the wettability by ink and/or the ink absorptivity of which is improved at its light-exposed portions by a light irradiation treatment or light irradiation and heat treatments, on the base;

(2) subjecting the resin layer to patterned exposure in the form of stripes or a matrix;

(3) ejecting the inks using the ink-jet system to separately color the exposed portions of the resin layer in red, green and blue colors; and (4) setting the colored portions of the resin layer by the heat treatment.

According to the present inventions there is yet still further provided a color filter produced by any one of the processes described above.

According to the present invention, there is yet still further provided a liquid crystal panel comprising any one of the color filters described above, a base provided in an opposing relation with the color filter and a liquid crystal compound charged in a space between both bases.

BRIEF DESCRIPTION OF THE DRAWINGS

FIG. 9 is a plan view of color filters for liquid crystals according to the present invention.

DESCRIPTION OF THE PREFERRED EMBODIMENTS

An embodiment of the present invention will hereinafter be described in detail by reference to the drawings.

Figure 2A:
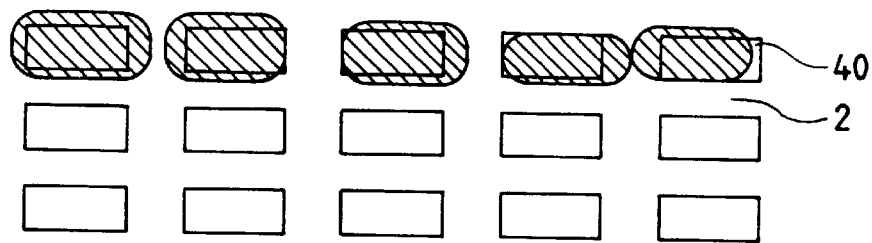
FIGS. 2A and 2B each illustrate productional examples of color filters poor in matching of an ink with a surface of a base.
Figure 2B:
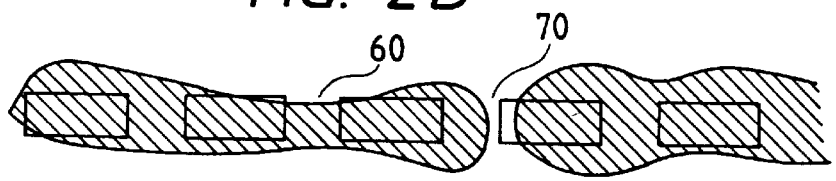

FIGS. 2A and 2B illustrate problems arisen at colored portions of color filters formed with ink dots by an ink-jet system.

FIG. 2A is a typical drawing viewed from the ink-applied surface of the color filter and illustrates the fact that since the precision of ink-droplet impact is poor, light-transmitting areas are not completely covered with colored portions, and so a blank area 40 is generated due to the positional deviation of the ink droplets. If such a sort of defect exists in pixels, an image formed through the color filter becomes low contrast and indefinite. Reference numeral 2 in FIG. 2A or 1A is a light screening area.

Figure 1A:
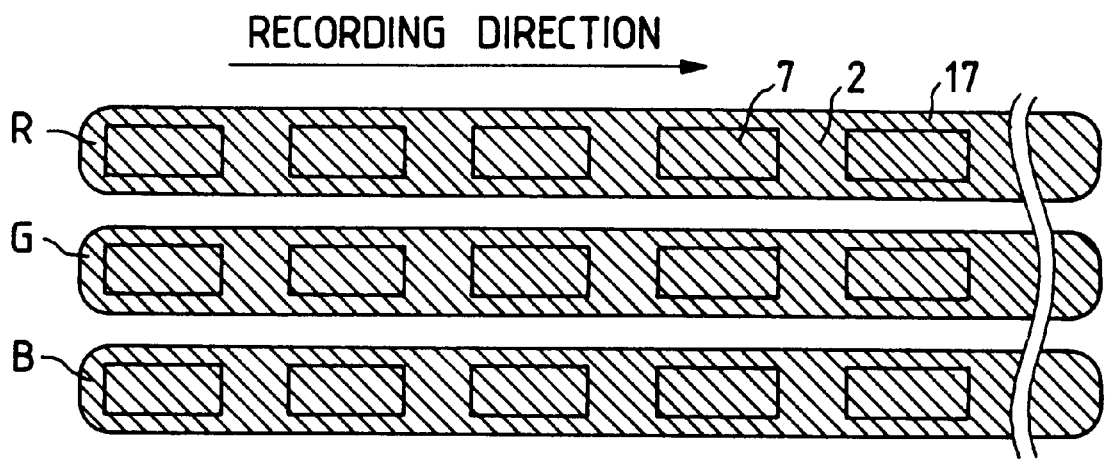
FIGS. 1A and 1B each illustrate production processes of a color filter according to the present invention.
Figure 1B:
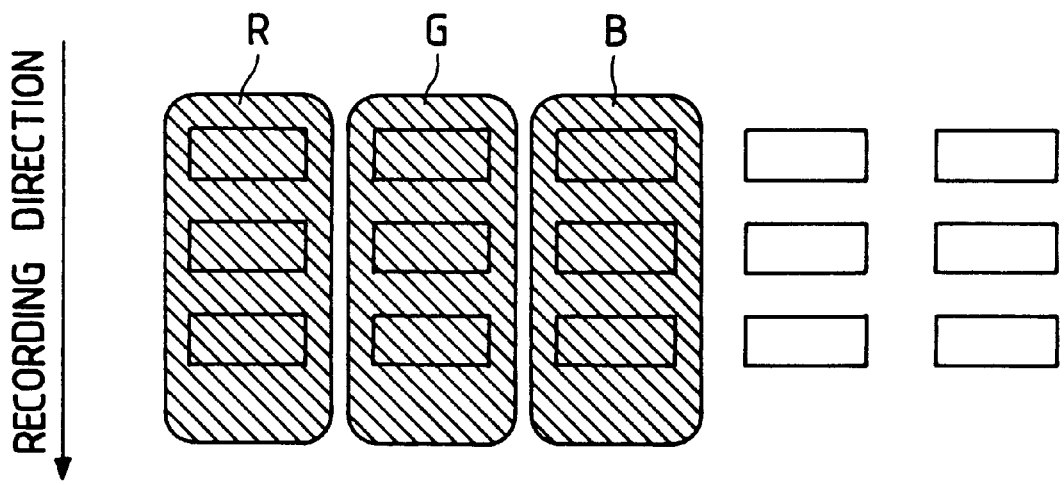

FIGS. 1A and 1B illustrate a production process of a color filter according to the present invention, in which each of colored portions 17 is formed so as to completely cover light-transmitting areas 7, and is constructed continuously over a plurality of the light-transmitting areas, i.e., in the form of a stripe. Since light-screening areas between the light-transmitting areas are also covered with the colored layer by constructing the colored portions in such a stripe form, it is possible to avoid the occurrence of any blank area. Therefore, such a color filter is preferred because an image formed through the color filter becomes vivid Incidentally, a recording direction and the arrangement of pixels of R, G and B colors upon the formation of the stripe-like colored portions by an ink-jet system are not limited to those of the method illustrated in FIGS. 1A and 1B.

A preferable process for continuously forming the above-described colored portion over a plurality of the light-transmitting areas will then be described.

The present inventors have carried out an extensive investigation. As a result, it has been discovered that it is important to adjust the wettability of a color filter base by ink, which is determined by the properties of both an ink used and a surface of the color filter base (an ink-applied surface). More specifically, if the hydrophilicity of the ink-applied surface is low upon the formation of the stripe-like colored portion, the width of the stripe formed becomes uneven, and so-called constricted parts are hence caused in places. In this case, a blank area is consequently caused like FIG. 2B even if the colored portion is formed in the stripe form for preventing the occurrence of the blank area. Therefore, the contrast of an image formed through such a color filter is lowered.

FIG. 2B illustrates the occurrence of the blank area due to the constricted parts 60 caused in the case where the hydrophilicity of the ink-applied surface is low. In particular, on torn-off portions 70 at which the degree of the hydrophilicity is lower (portions easier to repel ink), a stripe may be partially broken, and so a light-transmitting area of the base may be completely exposed in some cases. The occurrence of a blank area due to such a phenomenon is not a problem offered by the pigment dispersing process heretofore used in the formation of color filters, but a specific problem offered upon the formation of color filters by the ink-jet system.

As described above, when a colored portion is formed in the stripe form for avoiding the occurrence of blank areas due to the poor precision of ink-droplet impact, the mere arrangement of ink droplets in the stripe form is not enough. It is hence necessary to adjust the wettability of the base at the ink-applied surface to an optimum value. For doing so, it is necessary to suitably adjust the surface tension of an ink used and the hydrophilicity of the base surface. Preferred conditions thereof are shown below.

Surface tension of ink: 20 to 60 dyne/cm, preferably 24 to 55 dyne/cm, more preferably 28 to 50 dyne/cm Surface of a color filter base: formation of an ink-receiving layer by a hydrophilic polymer, or use of a glass or plastic base from which fats and oils have been removed by washing.

It is preferable to suitably select both conditions, thereby forming the stripe-like colored portions by the ink-jet system. The adjustment of the surface tension of an ink within the preferred range described above can be achieved by selecting the kind and amount of a water-soluble solvent added to the ink.

Examples of the preferred solvent added to the ink include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone, 2-pyrrolidone and 1,3-dimethyl-2-imidazolidinone; and the like.

A surfactant such as a nonionic surfactant or an anionic surfactant may also be used. The surface tension of the ink to which a variety of these water-soluble solvents and/or the surfactant has been added may be measured by means of a Wilhelmy's surface tension balance or the like.

The viscosity of an ink suitable for the ink-jet system is within a range of from 1.2 to 20 cP, preferably from 1.5 to 10 cP, more preferably from 15 to 8 cP in view of the ejection property of the ink, the spread of an ink dot upon the impact of an ink droplet, or the like.

In order to make the surface of a color filter base hydrophilic as described above, thorough washing of a glass surface may satisfy. However, it is preferable to form a film of each of the following compounds on the base surface. As examples of such compounds, may be mentioned synthetic resins such as polyvinyl pyrrolidone, polyvinyl alcohol, polyvinyl acetal, polyurethane, carboxymethyl-cellulose, polyester, polyacrylic acid (esters), hydroxyethylcellulose, hydroxypropylcellulose, melamine resins and modified products of these polymers; and natural resins such as albumin, gelatin, casein, starch, cationic starch, gum arabic and sodium alginate, to which, however, are not limited. Of these, cellulose derivatives such as hydroxypropylcellulose are particularly preferably used. A plurality of these compounds may be used at the same time.

The combination of the ink composition with the hydrophilic base as described above can prevent the occurrence of blank areas due to the constricted parts as illustrated in FIG. 2B. More preferably, it is more effective that an initial contact angle formed between them be 60° or lower, more preferably 50° or lower.

The initial contact angle as used herein means a contact angle measured immediately after the ink comes into contact with the base surface, preferably, within 1 minute after the contact. Contact angles measured after time longer than this limit goes on are affected by the evaporation of components in the ink, for example, water, and are hence not preferred. The amount of an ink droplet upon the measurement of the initial contact angle may be optional. However, the initial contact angle is preferably measured in an amount of 10 $\mu$l or smaller because it tends to be affected by gravity if the ink droplet grows to a certain extent, and so the measurement may possibly become imprecise.

The initial contact angle may be directly measured by means of a commercially-available goniometer or the like.

A process such as spin coating, roll coating, bar coating, spray coating or dip coating may be used for forming the films of the above-described compounds on the ink-applied surface.

As colorants (coloring materials) contained in inks used for forming the colored portions of R, G and B, there may be used various dyes or pigments heretofore used in ink-jet recording methods. Of these, organic pigments are preferably used from the viewpoint of improving heat resistance and light fastness, and the like. As a method of forming black matrices serving as light-screening areas in this embodiment, may be mentioned, in the case where the black matrices are directly provided on the base, a method in which a metal film is formed on the base by sputtering or vacuum deposition, and this film is patterned by a photolithographic process, or in the case where the black matrices are provided on the resin composition, a patterning method by a general photolithographic process using a black resist, to which, however, are not limited in this invention.

In the above-described embodiment, an example that a base for the color filter is equipped with the black matrices has been described. However, the production process according to the present invention can be applied to a color filter used in a liquid crystal panel of a so-called BM on array type, in which the black matrices are mounted on a base opposite to the color filter in the liquid crystal panel.

Figure 3:
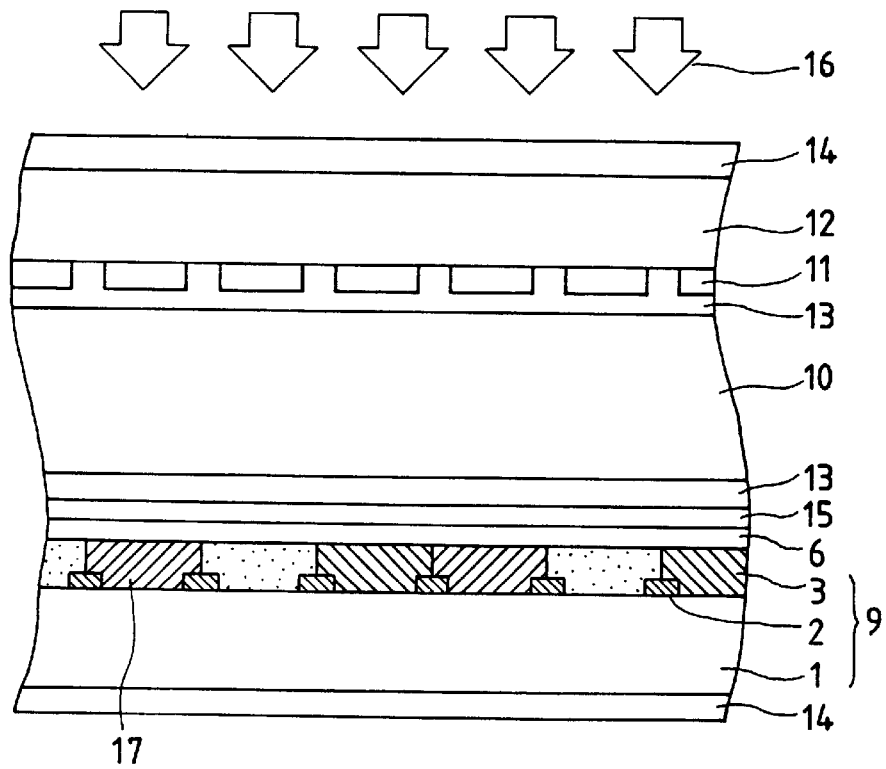
FIG. 3 illustrates a sectional structure of a liquid crystal panel in which the color filter according to the present invention has been mounted.

FIG. 3 illustrates a cross-sectional view of a TFT color liquid crystal panel in which the color filter according to the present invention has been mounted. The color liquid crystal panel is formed by uniting a color filter base 1 and a base 12 opposite to the color filter base 1 and charging a liquid crystal compound 10 in a space between the bases. TFT (not illustrated) and transparent pixel electrodes 11 are formed in the form of a matrix inside the base 12. A color filter 9 is arranged at a position opposite to the pixel electrodes 11 inside the other base 1. A transparent counter (common) electrode 15 is formed over on the color filter 9. Orientation films 13 are further formed within the surfaces of both bases. Liquid crystal molecules can be oriented in a fixed direction by subjecting these films to a rubbing treatment. Polarizing plates 14 are bonded to the outer surfaces of both glass bases. The liquid crystal compound 10 is charged in a space (about 2 to 5 $\mu$m) between these glass bases. As a back light 16, a combination of a fluorescent lamp and a scattering plate (both, not shown) is used. The liquid crystal compound 10 is caused to function as a shutter for changing the transmittance of rays from the back light 16, thereby making a display. Reference numeral 6 is a protective layer, 3 a resin layer, 2 a black matrix and 17 colored portions, respectively.

Another embodiment of the present invention will then be described by reference to the drawings.

FIGS. 4A to 4F show a flow sheet illustrating another production process of a color filter for liquid crystals according to the present invention, and illustrate an example of the construction of the color filter for liquid crystals according to the present invention.

In the present invention, a glass base is generally used as a base. However, the base is not limited to the glass base so far as it has properties required of the color filter for liquid crystals, such as transparency and mechanical strength.

Figure 4A:
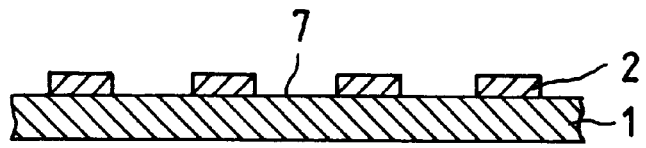
FIGS. 4A through 4F illustrate another production process of a color filter for liquid crystals according to the present invention.
Figure 4B:
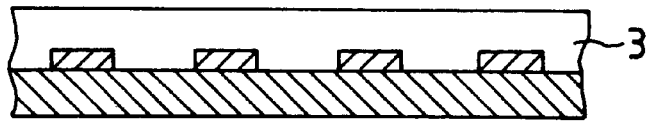

FIG. 4A illustrates the formation of black matrices as light-screening areas on a glass base 1 having light-transmitting areas 7 (apertures). A resin composition, the wettability by ink and/or the ink absorptivity of which is lowered at its light-exposed portions by irradiation or irradiation and a heat treatment, is then applied on the base 1 on which the black matrices 2 have been formed, and is prebaked, as needed, to form a resin layer 3 (FIG. 4B). Incidentally, an example that the layer of the resin composition is reacted by the irradiation alone is described in this embodiment. However, a resin composition to be subjected to both irradiation and heat treatment may also be used. No particular limitation is imposed on the process for the formation of the resin layer, and a coating process such as spin coating, roll coating, bar coating, spray coating or dip coating may be used.

Figure 4C:
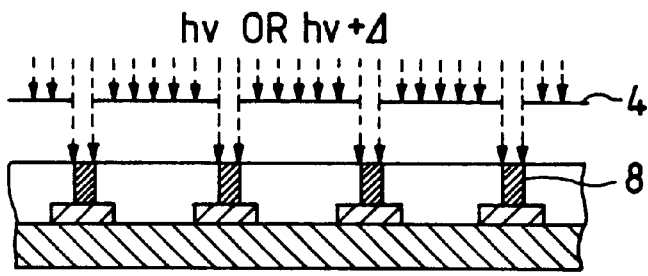
Figure 4D:
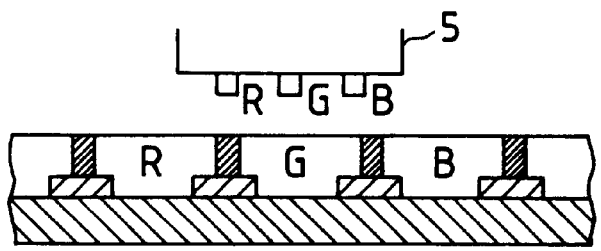
Figure 4E:
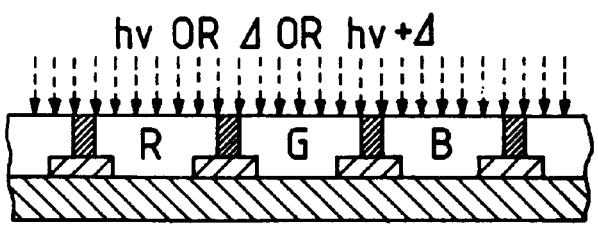

The resin layer is then subjected to patterned exposure in the form of stripes at portions corresponding to the areas to be screened from light by the black matrices 2 using a mask 4 having openings in the form of a stripe, thereby reacting the resin to obtain color mixing-preventing walls 8 (exposed portions) (FIG. 4C). Thereafter, the resin layer is colored in R, G and B colors at the same level using an ink-jet head 5 (FIG. 4D). The inks applied are dried as needed.

As the photomask 4 used upon the patterned exposure, there is used a photomask having openings for exposing the resin layer in the stripe form at portions corresponding to the areas to be screened from light by the black matrices 2. In view of the need of ejecting an ink in a rather great amount to prevent the failure in coloring at a boundary between the black matrix and the aperture 7 as the light-transmitting area, at this time, it is preferable to use a mask having openings narrower than the light-screening width of the black matrix.

As the inks used in the coloring, both coloring matter inks and pigment inks may be used. As the ink-jet system, a bubble-jet type making use of an electrothermal converter as an energy-generating element or a piezo-jet type making use of a piezoelectric element may be used. A coloring area and a coloring pattern may be optionally preset.

Figure 5:
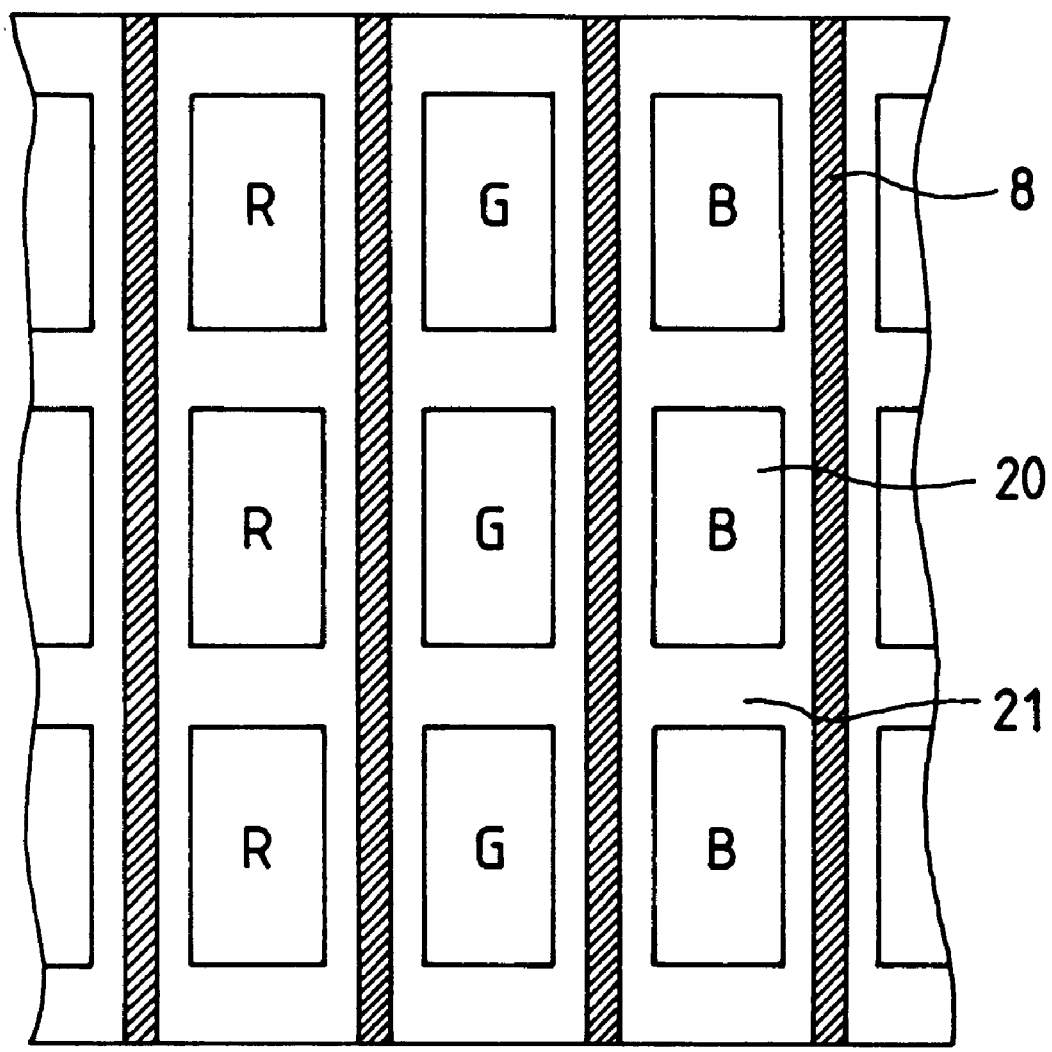
FIG. 5 is a plan view views of color filters for liquid crystals according to the present invention.

FIG. 5 illustrates the color filters according to the present invention viewed from above the base. The patterned exposure may be performed either in the stripe form as illustrated in FIG. 5 illustrates.

Figure 6A:
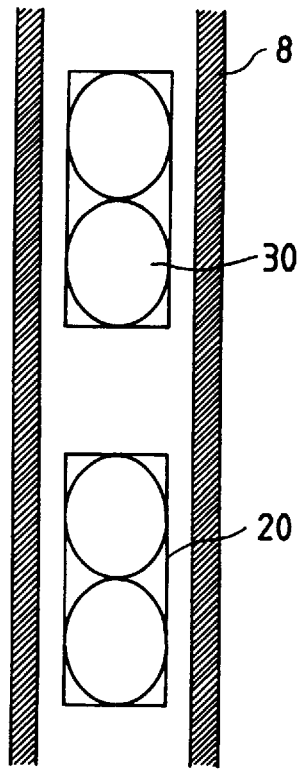
FIGS. 6A and 6B each illustrate coloring methods by an ink-jet system in the production of color filters for liquid crystals according to the present invention.
Figure 6B:
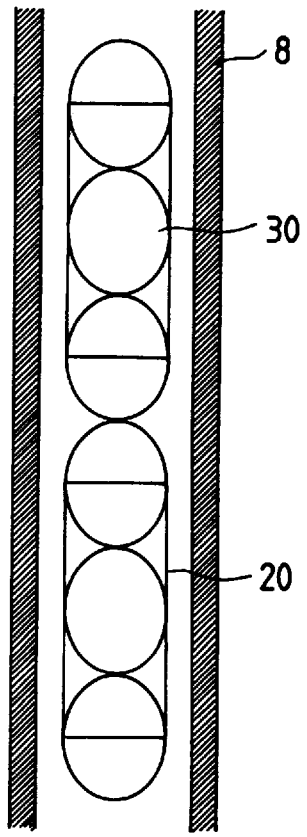

FIGS. 6A and 6B each illustrate exemplary coloring methods.

FIG. 6A illustrates a method in which pixels having the same color are colored by dividing the pixels in portions, while FIG. 6B illustrates a method in which pixels having the same color are continuously colored. In order to prevent the failure in coloring in the longitudinal direction of the pixel, the pixel may preferably be colored with consecutive ink dots as illustrated in FIG. 6B. However, the coloring is not limited to such a method In this embodiment, an example that the black matrices are formed on the base has been described. No particular problem is however offered even when the black matrices are formed on the resin layer after the formation of the resin layer or the coloring, or on a base opposite to the color filter base. The form thereof is not limited to this embodiment. As examples of a methods of forming the black matrices, may be generally mentioned a method in which a metal film is formed on the base by sputtering or vacuum evaporation, and this film is patterned by a photolithographic process, and a method in which a black photosensitive resin is used to directly pattern it by a photolithographic process, to which, however, are not limited.

Figure 4F:
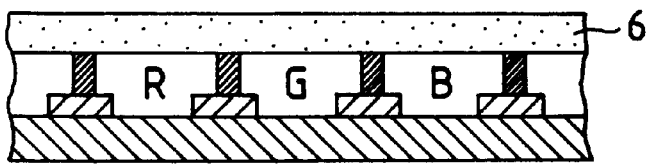

The resin layer thus colored is then subjected to irradiation and/or a heat treatment to set it (FIG. 4E), and a protective layer 6 is formed on the resin layer as needed (FIG. 4F).

As the protective layer, may be used a resin material of the photo-setting type, thermosetting type or light- and heat-curing type, or an inorganic film formed by vacuum evaporation, sputtering or the like. Any material may be used so far as it has sufficient transparency to be used in a color filter and withstands subsequent ITO-forming process, orientation film-forming process and the like.

In order to produce a color filter in which the colored portions completely cover the apertures defined by the black matrices and each of the colored portions is constructed continuously over a plurality of the apertures, i.e., in the form of a stripe, as illustrated in FIG. 6B, it is necessary to adjust the wettability of the color filter base by ink, which is determined by the properties of both an ink used and a surface of the color filter base (an ink-applied surface). For doing so, it is necessary to suitably adjust the surface tension of the ink used and the hydrophilicity of the base surface. Preferred conditions thereof are as follows:

The surface tension of the ink is within a range of from 20 to 60 dyne/cm, preferably from 24 to 55 dyne/cm, more preferably from 28 to 50 dyne/cm, and a hydrophilic polymer is used on a surface of the color filter base.

Suitable selection of both conditions permits the formation of the stripe-like colored portions by an ink-jet recording method. As described above, the adjustment of the surface tension of the ink within the preferred range described above can be achieved by selecting the kind and amount of a water-soluble solvent added to the ink. It is also preferable to preset an contact angle so as to fall within the above-described range.

In this embodiment, the conditions for coloring in the stripe form may be more generous than those in the first-mentioned embodiment because the color mixing-preventing walls are provided.

FIGS. 7A to 7F illustrate a production process of a color filter used in a liquid crystal panel in which black matrices are provided on a base opposite to a color filter base.

A process in which the black matrices are provided on the opposite base, not on the color filter base is useful as a method of improving aperture efficiency.

Figure 7A:
FIGS. 7A through 7F illustrate a further production process of a color filter for liquid crystals according to the present invention.
Figure 7B:
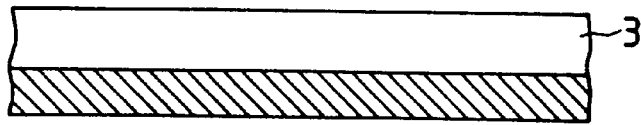

A resin composition good in water-based ink absorptivity, said ink absorptivity being lowered at its light-exposed portions by irradiation or irradiation and a heat treatment, is applied on a glass base 1 illustrated in FIG. 7A, and is prebaked, as needed, to form a resin layer 3 the ink absorptivity of which is lowered at its light-exposed portions by irradiation or irradiation and a heat treatment (FIG. 7B).

Figure 7C:
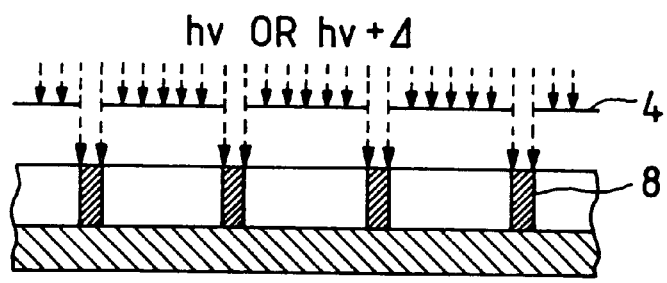
Figure 7D:
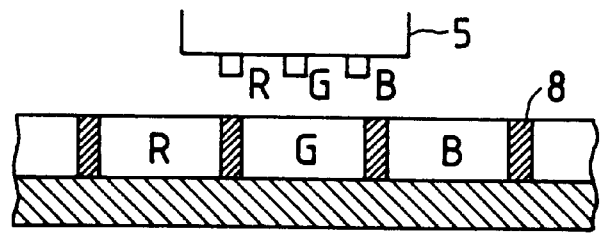
Figure 7E:
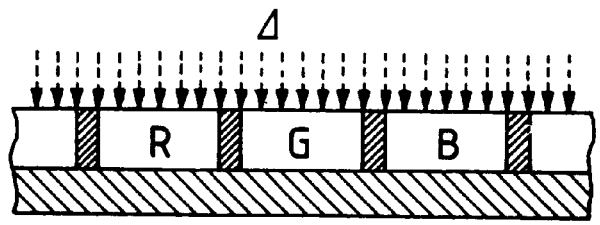
Figure 7F:
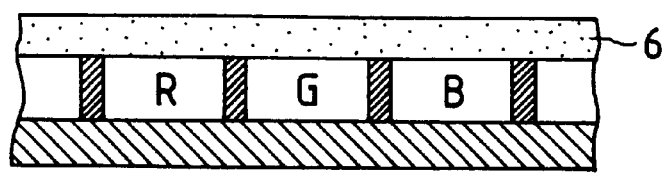

Patterned exposure is then conducted by means of a photomask 4, thereby lowering the ink absorptivity of the resin layer 3 at the light-exposed portions 8 to form color mixing-preventing walls (FIG. 7C). Thereafter, unexposed portions of the resin layer are separately colored in R, G and B colors in the form of stripes using an ink-jet head 5 (FIG. 7D). The inks applied are dried as needed. In order to prevent the failure in coloring, it is important to make the width of the light-exposed portion 8, which is also the color mixing-preventing wall, narrower than that of the black matrix (not shown) provided on the opposite base.

FIGS. 8A to 8F illustrate a further production process of a color filter for liquid crystals according to the present invention, and exemplifies the construction of the color filter for liquid crystals according to the present invention.

Figure 8A:
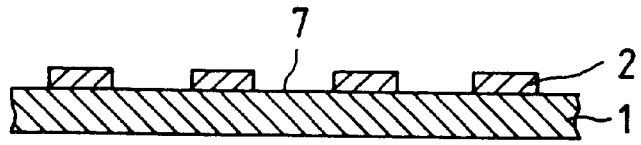
FIGS. 8A through 8F illustrate a still further production process of a color filter for liquid crystals according to the present invention.
Figure 8B:
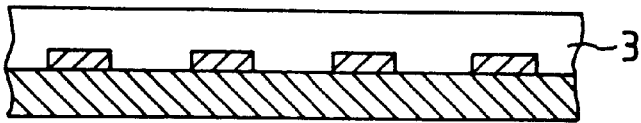
Figure 8C:
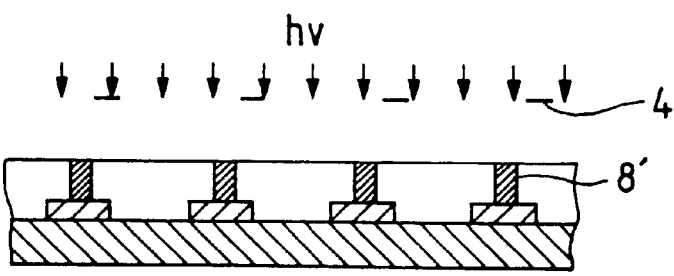

FIG. 8A illustrates the formation of black matrices on a glass base 1 having light-transmitting areas 7 (apertures defined by the black matrices). A resin composition, the wettability by ink and/or the ink absorptivity of which is improved at its light-exposed portions by irradiation or irradiation and a heat treatment, is then applied on the base 1 on which the black matrices 2 have been formed, and is prebaked, as needed, to form a resin layer 3 (FIG. 8B). Incidentally, an example that the layer of the resin composition is reacted by the irradiation alone is described in this embodiment. However, a resin composition to be subjected to both irradiation and heat treatment may also be used without problems.

Figure 8D:
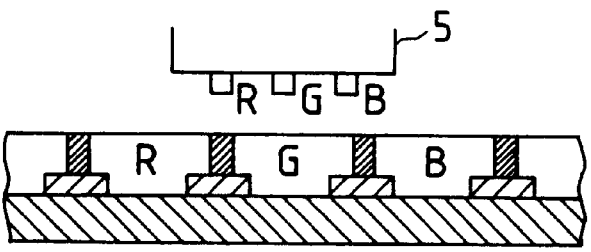
Figure 8E:
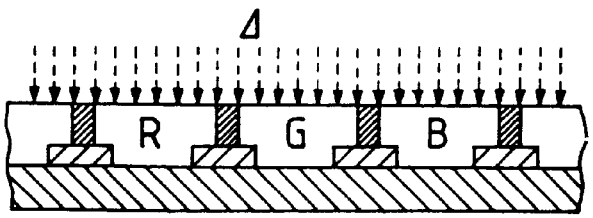

After the resin layer is then subjected to patterned exposure in advance using a mask 4 to react the resin composition (FIG. 8C, in this embodiment, unexposed portions 8' serve as color mixing-preventing walls), the exposed portions of the resin layer are separately colored in R, G and B colors in the form of stripes using an ink-jet head 5 (FIG. 8D). The inks applied are dried as needed.

Figure 8F:
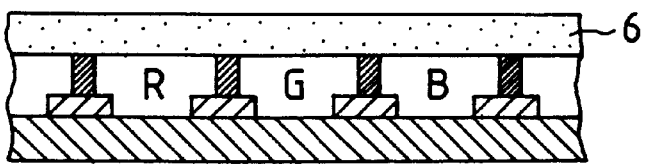

The resin layer thus colored is then subjected to irradiation and/or a heat treatment to set it (FIG. 8E) and a protective layer 6 is formed on the resin layer as needed (FIG. 8F).

As the photomask 4 used upon the patterned exposure, there is used a photomask having openings for exposing the resin layer 3 in the stripe form at portions to be colored by an ink-jet head 5. In view of the need of ejecting an ink in a rather great amount to prevent the failure in coloring at a boundary between the black matrix and the aperture, at this time, it is preferable to use a mask having openings wider than that of the aperture defined by the black matrices.

FIG. 9 illustrates color filters according to the present invention viewed from above the 1 base. The patterned exposure may be performed either in the stripe form as illustrated in FIG. 9.

FIGS. 10A to 10E illustrate another production process of a color filter used in a liquid crystal panel in which black matrices are provided on a base opposite to a color filter base.

Figure 10A:
FIGS. 10A through 10E illustrate a yet still further production process of a color filter for liquid crystals according to the present invention
Figure 10B:
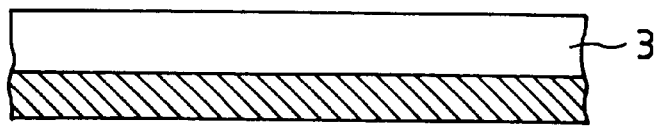

A resin composition, the ink absorptivity of which is improved at its light-exposed portions by irradiation or irradiation and a heat treatment, is applied on a glass base 1 illustrated in FIG. 10A, and is prebaked, as needed, to form a resin layer 3 the ink absorptivity of which is improved at its light-exposed portions by irradiation or irradiation and a heat treatment (FIG. 10B).

Figure 10C:
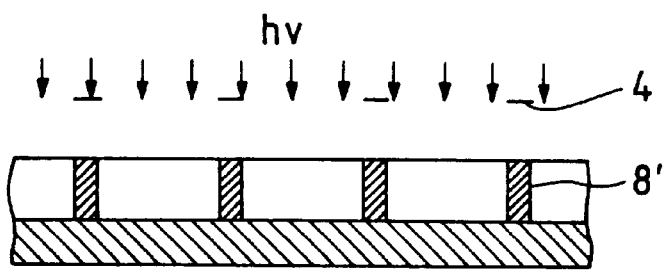
Figure 10D:
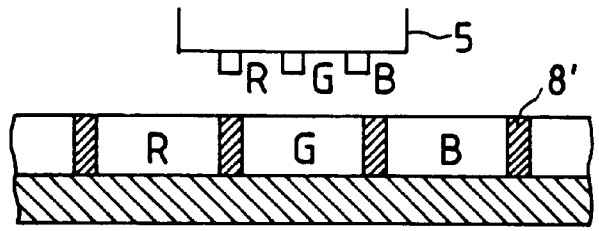
Figure 10E:
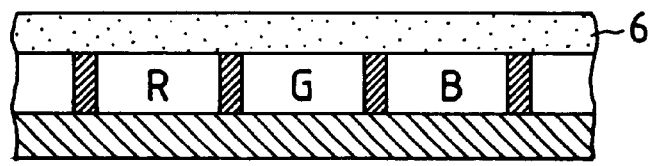

Patterned exposure is then conducted by means of a photomask 4, thereby improving the ink absorptivity of the resin layer 3 at the light-exposed portions 8 (FIG. 10C). Thereafter, the exposed portions of the resin layer are separately colored in R, G and B colors in the form of stripes using an ink-jet head 5 (FIG. 10D). The inks applied are dried as needed In order to prevent the failure in coloring, it is important to make the width of the color mixing-preventing wall (unexposed portion) 8' narrower than that of the black matrix (not shown) provided on the opposite base.

Figure 11:
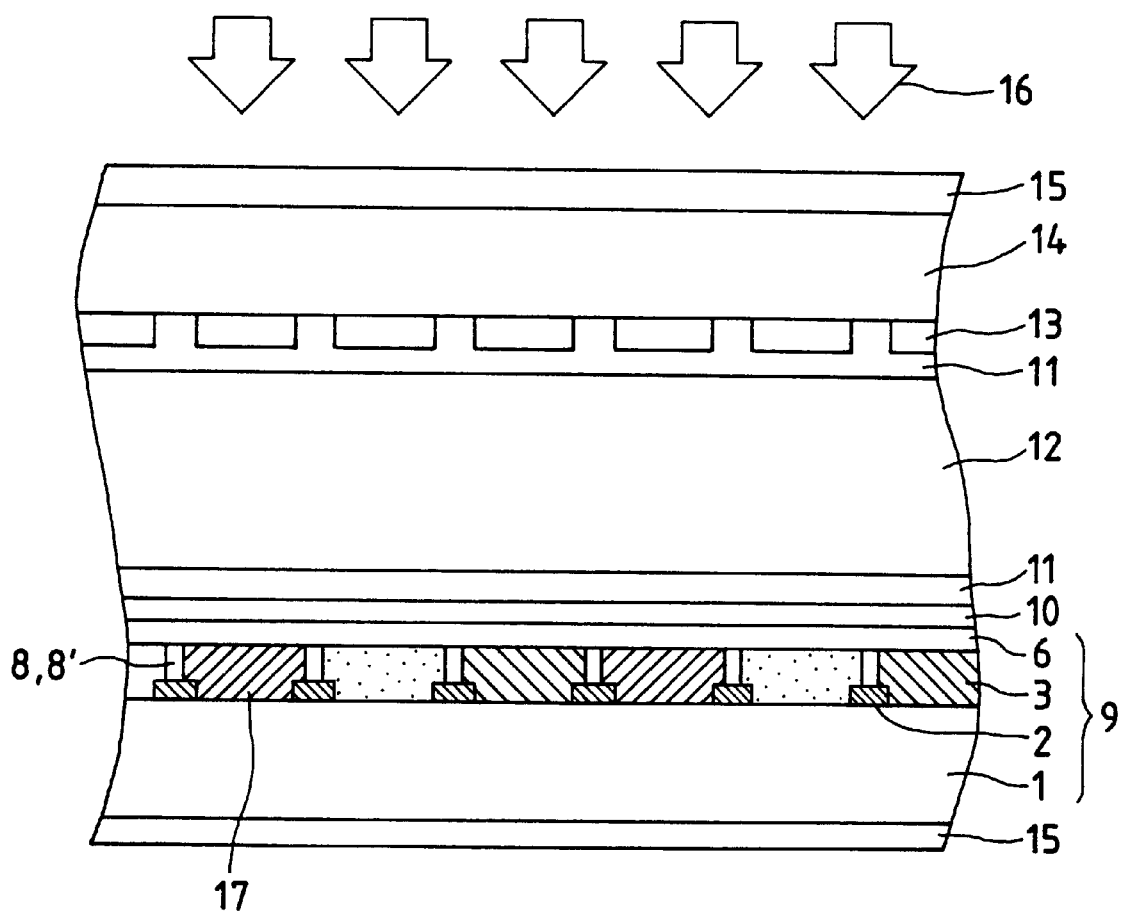
FIG. 11 is a cross-sectional view of another liquid crystal panel in which the color filter according to the present invention has been mounted.
Figure 12:
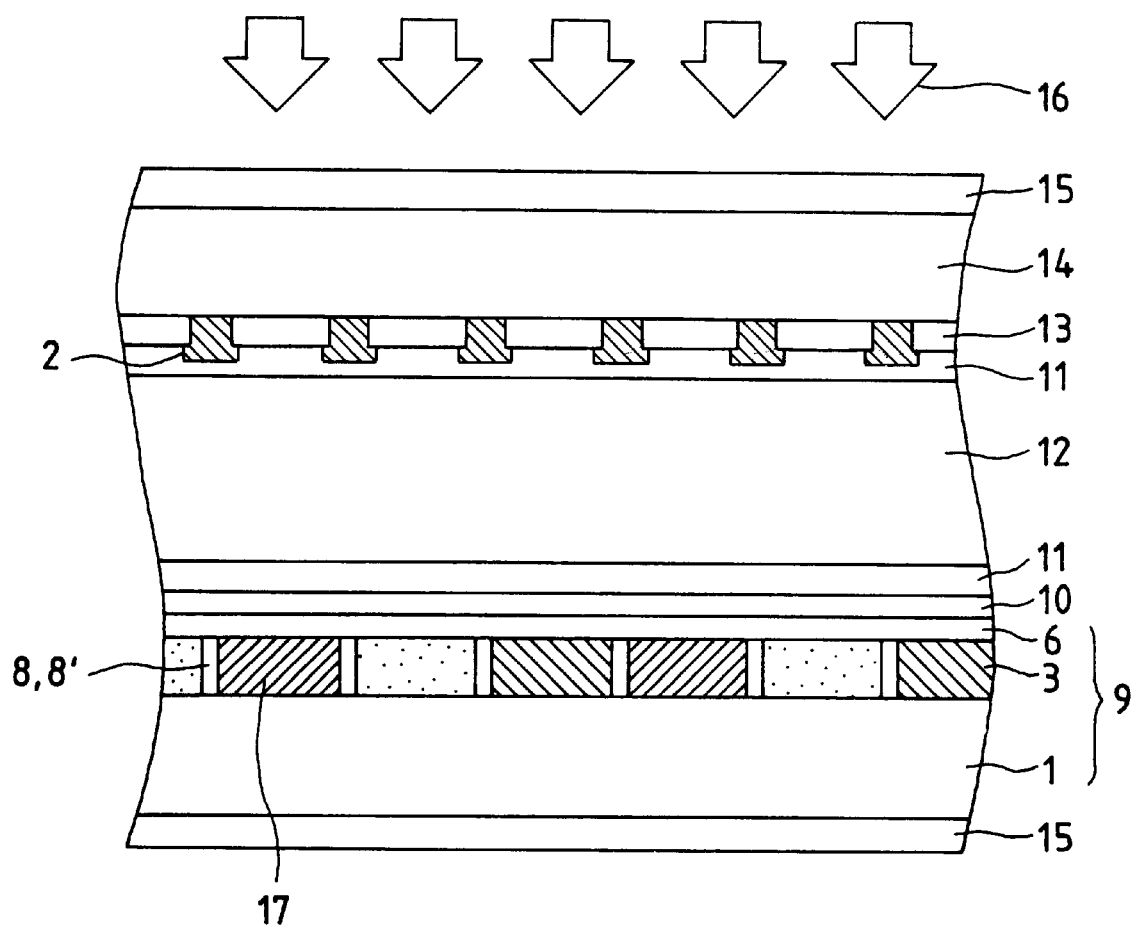
FIG. 12 is a cross-sectional view of a further liquid crystal panel in which the color filter according to the present invention has been mounted.

FIGS. 11 and 12 each illustrate cross-sectional views of TFT color liquid crystal panels in which the color filter according to the present invention has been mounted. Incidentally, the form thereof is not limited to these embodiments.

A color liquid crystal panel is generally formed by uniting a color filter base 1 and a base 14 opposite to the color filter base 1 and charging a liquid crystal compound 12 in a space between the bases. TFT (not illustrated) and transparent pixel electrodes 13 are formed in the form of a matrix inside the base 14. A color filter 9 is arranged inside the other base 1 so as to array the coloring materials of R, G and B at positions opposite to the pixel electrodes. A transparent counter (common) electrode 10 is formed over on the color filter 9. Black matrices 2 are usually formed on the side of the color filter base (FIG. 11), but formed on the side of the opposite TFT base in a liquid crystal panel of the BM on array type (FIG. 12). Orientation films 11 are further formed within the surfaces of both bases. Liquid crystal molecules can be oriented in a fixed direction by subjecting these films to a rubbing treatment. Polarizing plates 15 are bonded to the outer surfaces of both glass bases. The liquid crystal compound 12 is charged in a space (about 2 to 5 μm) between these glass bases. As a back light, a combination of a fluorescent lamp and a scattering plate (both, not shown) is generally used. The liquid crystal compound 12 is caused to function as a shutter for changing the transmittance of rays from the back light, thereby making a display. Reference numerals 8 and 8' denote a light-exposed portion and an unexposed portion, respectively. Other reference numerals in FIGS. 11 and 12 have the same meaning as in FIG. 3.

The present invention will hereinafter be described more specifically by the following Examples. However, the present invention is not limited to these examples only. Incidentally, all designations of "part" or "parts" and "%" as will be used in the following examples mean part or parts by weight and % by weight unless expressly noted.

EXAMPLE 1:

A resin composition comprising hydroxypropyl-cellulose HPC-H (product of Nippon Soda Co., Ltd.) was applied as an ink-receiving layer by spin coating onto a glass base having a plurality of light-transmitting areas of 60 μm by 150 μm in size, and equipped with black matrices as illustrated in FIG. 1A, and prebaked at 90° C. for 10 minutes.

Using an ink-jet head, colored portions of R, G and B were then formed in the form of stripes each having a width of 80 μm with respective inks of R, G and B colors having the following formulation as illustrated in FIG. 1A.

The colored portions thus formed were then baked at 230° C. for 1 hour. A two-pack type thermosetting resin material was subsequently applied by spin coating onto the layer of the resin composition to give a coating thickness of 1 μm. The thus-formed film was heat-treated at 250° C. for 30 minutes to set it, thereby producing a color filter for liquid crystals.

Ink formulation:
Ethylene glycol 20%
Isopropyl alcohol 5%
R, G or B dye described below 3%
Water 72%
R (red) dye: mixture of C.I. Acid Red 35/Acid Yellow 23
G (green) dye: mixture of C.I. Acid Blue 9/Acid Yellow 23
B (Blue) dye: mixture of C.I. Acid blue 9/Acid Red 35.
The surface tensions of the above inks were measured and each found to be 48 dyne/cm. They each had a viscosity of 1.8 cP. The initial contact angle of the inks was 30°.

EXAMPLE 2:

A resin composition comprising hydroxypropyl-cellulose HPC-H (product of Nippon Soda Co., Ltd.) was applied as an ink-receiving layer by spin coating onto a glass base having a plurality of light-transmitting areas of 50 μm by 130 μm in size, and equipped with black matrices as illustrated in FIG. 1, and prebaked at 90° C. for 15 minutes.

Using an ink-jet printer, colored portions of R, G and B were then formed in the form of stripes each having a width of 60 μm with respective inks of R, G and B colors having the following formulation as illustrated in FIG. 1A.

The colored portions thus formed were then baked at 230° C. for 1 hour. A two-pack type thermosetting resin material was subsequently applied by spin coating onto the layer of the resin composition to give a coating thickness of 1 μm. The thus-formed film was heat-treated at 250° C. for 30 minutes to set it, thereby producing a color filter for liquid crystals.

Ink formulation:
Ethylene glycol 20%
Diethylene glycol 2%
Ethyl alcohol 2%
R, G or B dye described below 2.5%
Water 73.5%
R (red) dye: mixture of C.I. Acid Red 35/Acid Yellow 23
G (green) dye: mixture of C.I. Acid Blue 9/Acid Yellow 23
B (Blue) dye: mixture of C.I. Acid blue 9/Acid Red 35.
The surface tensions of the above inks were measured and each found to be 58 dyne/cm. They each had a viscosity of 1.9 cP. The initial contact angle of the inks was 28°.

COMPARATIVE EXAMPLE 1:

A color filter for liquid crystals was produced in the same manner as in Example 1 except that the following inks were used in place of the inks used in Example 1.

Ink formulation:
Ethylene glycol 20%
R, G or B dye (the same as in Example 1) 3%
Water 77%
The above inks each had a surface tension 66 dyne/cm and a viscosity of 1.8 cP. The initial contact angle of the inks was 35°.

COMPARATIVE EXAMPLE 2:

A color filter for liquid crystals was produced in the same manner as in Example 2 except that the following inks were used in place of the inks used in Example 2.

Ink formulation:
Diethylene glycol 20%
R, G or B dye (the same as in Example 2) 2.5%
Water 77.5%.
The above inks each had a surface tension 62 dyne/cm and a viscosity of 1.7 cP. The initial contact angle of the inks was 37°.

The color filters for liquid crystals produced in Examples 1 and 2 were observed through a light microscope. As a result, defects such as blank areas at the individual colored portions of R, G and B and lowering of contrast were not observed.

Besides, each of the color filters thus obtained was used to conduct a series of operations such as formation of ITO, formation of orientation films and charging of a liquid crystal material, thereby producing a color liquid crystal panel as illustrated in FIG. 3.

Using the thus-produced color liquid crystal panel, various image patterns were formed on the panel to evaluate the images in definition Good results were shown as to all the images. In particular, the panel produced on the basis of Example 1 was excellent in image definition.

With respect to images formed through the color filters according to the comparative examples, on the other hand, the blank area-shining phenomenon was often recognized. Therefore, such images were low in contrast and lacking in definition.

EXAMPLES 3 TO 6 AND COMPARATIVE EXAMPLES 3 TO 6:

Tests similar to that in Example 1 were then performed under their corresponding conditions shown in the following Table 1. Besides, comparative tests with Examples 3 to 6 were performed in the same manner as in Comparative Example 1 except that their corresponding conditions shown in Table 1 were used.

TABLE 1

|  | Ink formulation | Material for ink-receiving layer |
|---|---|---|
| Ex. 3 | The same as in Example 1 | Polyvinyl acetal |
| Ex. 4 | The same as in Example 1 | Carboxymethylcellulose |
| Ex. 5 | The same as in Example 1 | Hydroxyethylcellulose |
| Ex. 6 | The same as in Example 2 | Polyethyl acrylate |
| Comp. Ex. 3 | The same as in Comp. Example 1 | The same as in Example 3 |
| Comp. Ex. 4 | The same as in Comp. Example 1 | The same as in Example 4 |
| Comp. Ex. 5 | The same as in Comp. Example 1 | The same as in Example 5 |
| Comp. Ex. 6 | The same as in Comp. Example 1 | The same as in Example 6 |

The color filters for liquid crystals produced in Examples 3 to 6 were observed through a light microscope. As a result, defects such as blank areas at the individual colored portions of R, G and B and lowering of contrast were not observed.

Besides, each of the color filters thus obtained was used to conduct a series of operations such as formation of ITO, formation of orientation films and charging of a liquid crystal material, thereby producing a color liquid crystal panel as illustrated in FIG. 3.

Using the thus-produced color liquid crystal panel, various image patterns were formed on the panel to evaluate the images in definition Good results were shown as to all the images.

With respect to images formed through the color filters according to Comparative Examples 3 to 6, on the other hand, the blank area-shining phenomenon was often recognized. Therefore, such images were low in contrast and lacking in definition.

EXAMPLE 7:

Onto a glass base 1 on which black matrices 2 had been formed as illustrated in FIG. 4A, a resin composition comprising 97 parts of an acrylic copolymer having the following composition:
methyl methacrylate 50 parts
hydroxyethyl methacrylate 30 parts
N-methylolacrylamide 20 parts
and 3 parts of triphenylsulfonium hexafluoroantimonate dissolved in ethyl cellosolve was applied by spin coating to give a coating thickness of 2 μm, and prebaked at 90° C. for 10 minutes, thereby forming a resin layer 3.

Portions of the resin layer 3 on the black matrices 2 were then subjected to patterned exposure in the form of stripes through a photomask 4 having stripe-like openings narrower than the width of the black matrix 2. The thus-exposed resin layer was further subjected to a heat treatment for 1 minute on a hot plate heated to 120° C., thereby forming color mixing-preventing walls 8. Using an ink-jet head 5, unexposed portions of the resin layer 3 were colored on the pattern of a stripe form with consecutive dots of dye inks of R, G and B colors. The inks thus applied were then dried at 90° C. for 5 minutes. The resin layer was subsequently subjected to a heat treatment at 200° C. for 60 minutes to set it.

A photo-setting resin composition comprising an epoxyacrylate and a photo-induced initiator was further applied by spin coating onto the colored base to give a coating thickness of 1 μm, and prebaked at 90° C. for 30 minutes, thereby forming a protective layer 6. The thus-formed protective layer 6 was then wholly exposed to set it, thereby producing a color filter for liquid crystals.

The color filter for liquid crystals thus produced was observed through a light microscope. As a result, defects such as color mixing, color irregularity and failure in coloring were not observed.

This color filter for liquid crystals was used to produce a TFT liquid crystal panel as illustrated in FIG. 11. The operation of this panel revealed that vivid color images were able to be displayed.

EXAMPLE 8:

Onto a glass base 1 on which black matrices 2 had been formed, a resin composition comprising 97 parts of an acrylic copolymer having the following composition:
methyl methacrylate 50 parts
N-methylolacrylamide 50 parts
and 3 parts of triphenylsulfonium triflate dissolved in ethyl cellosolve was applied by spin coating to give a coating thickness of 2 μm, and prebaked at 90° C. for 20 minutes, thereby forming a resin layer 3.

Portions of the resin layer 3 on the black matrices 2 were then subjected to patterned exposure in the form of stripes through the same photomask 4 as that used in Example 7. The thus-exposed resin layer was further subjected to a heat treatment for 1 minute on a hot plate heated to 120° C., thereby forming color mixing-preventing walls 8. Using an ink-jet head 5, unexposed portions of the resin layer 3 were colored on the pattern of a stripe form with consecutive dots of dye inks of R, G and B colors. The inks thus applied were then dried at 90° C. for 5 minutes. The resin layer 3 was subsequently subjected to a heat treatment at 200° C. for 60 minutes to set it.

A two-pack type thermosetting resin composition (Optomer SS-6688, product of Japan Synthetic Rubber Co., Ltd.) was then applied by spin coating onto the colored base to give a coating thickness of 1 μm, and prebaked at 90° C. for 30 minutes, thereby forming a protective layer 6. The thus-formed protective layer 6 was then subjected to a heat treatment at 200° C. for 30 minutes to set it, thereby producing a color filter for liquid crystals.

The color filter for liquid crystals thus produced was observed through a light microscope. As a result, defects such as color mixing, color irregularity and failure in coloring were not observed.

This color filter for liquid crystals was used to produce a TFT liquid crystal panel as illustrated in FIG. 11. The operation of this panel revealed that vivid color images were able to be displayed.

EXAMPLE 9:

Onto a glass base 1 on which black matrices 2 had been formed, a resin composition comprising 98 parts of an acrylic copolymer having the following composition.
methyl methacrylate 60 parts
N-methoxymethylacrylamide 40 parts
and 2 parts of diphenyliodonium hexafluoroantimonate dissolved in ethyl cellosolve was applied by spin coating to give a coating thickness of 2 μm, and prebaked at 90° C. for 20 minutes, thereby forming a resin layer 3.

Portions of the resin layer 3 on the black matrices 2 were then subjected to patterned exposure in the form of stripes through the same photomask 4 as that used in Example 7. The thus-exposed resin layer was further subjected to a heat treatment for 1 minute on a hot plate heated to 120° C., thereby forming color mixing-preventing walls 8. Using an ink-jet head 5, unexposed portions of the resin layer 3 were colored on the pattern of a stripe form with consecutive dots of dye inks of R, G and B colors. The inks thus applied were then dried at 90° C. for 5 minutes. The resin layer 3 was subsequently subjected to a heat treatment at 200° C. for 60 minutes to set it.

A two-pack type thermosetting resin composition (Optomer SS-6688, product of Japan Synthetic Rubber Co., Ltd.) was then applied by spin coating onto the colored base to give a coating thickness of 1 μm, and prebaked at 90° C. for 30 minutes, thereby forming a protective layer 6. The thus-formed protective layer 6 was then subjected to a heat treatment at 200° C. for 30 minutes to set it, thereby producing a color filter for liquid crystals.

The color filter for liquid crystals thus produced was observed through a light microscope. As a result, defects such as color mixing, color irregularity and failure in coloring were not observed.

This color filter for liquid crystals was used to produce a TFT liquid crystal panel as illustrated in FIG. 11. The operation of this panel revealed that vivid color images were able to be displayed.

EXAMPLE 10:

As illustrated in FIGS. 7A to 7F, a resin composition comprising 98 parts of an acrylic copolymer having the following composition:

acrylic acid 3 parts
methyl methacrylate 50 parts
hydroxyethyl methacrylate 27 parts
N-methylolacrylamide 20 parts and 2 parts of triphenylsulfonium triflate dissolved in ethyl cellosolve was applied by spin coating onto a glass base 1 to give a coating thickness of 2 μm, and prebaked at 90° C. for 20 minutes, thereby forming a resin layer 3.

Portions of the resin layer 3 were then subjected to patterned exposure in the form of stripes through the same photomask 4 as that used in Example 7. The thus-exposed resin layer was further subjected to a heat treatment for 1 minute on a hot plate heated to 120° C., thereby forming color mixing-preventing walls 8. Using an ink-jet head 5, unexposed portions of the resin layer 3 were colored on the pattern of a stripe form with consecutive dots of dye inks of R, G and B colors. The inks thus applied were then dried at 90° C. for 5 minutes. The resin layer 3 was subsequently subjected to a heat treatment at 200° C. for 60 minutes to set it.

A photo-setting resin composition comprising an epoxyacrylate and a photo-induced initiator was then applied by spin coating onto the colored base to give a coating thickness of 1 μm, and prebaked at 90° C. for 30 minutes, thereby forming a protective layer 6. The thus-formed protective layer was then wholly exposed to set it, thereby producing a color filter for liquid crystals.

The color filter for liquid crystals thus produced was united to a base on which black matrices had been formed on the side of a TFT base as illustrated in FIG. 12, and a liquid crystal compound was charged in a space between both bases, thereby producing a liquid crystal panel. The operation of this panel revealed that vivid color images were able to be displayed. In addition, defects such as color mixing, color irregularity and failure in coloring were not observed in this color filter.

EXAMPLE 11:

Onto a glass base 1 on which black matrices 2 had been formed as illustrated in FIGS. 8A to 8F, methylphenylpolysilane was applied by spin coating to give a coating thickness of 2 μm, and prebaked at 90° C. for 20 minutes, thereby forming a resin layer 3.

Portions of the resin layer 3 were then subjected to patterned exposure in the form of stripes through a photomask 4 having stripe-like openings wider than the width of an aperture 7 defined by the black matrices 2, thereby forming color mixing-preventing walls 8.

Using an ink-jet head 5, the exposed portions of the resin layer 3 were colored on the pattern of a stripe form with consecutive dots of dye inks of R, G and B colors. The inks thus applied were then dried at 90° C. for 5 minutes The resin layer was subsequently subjected to a heat treatment at 200° C. for 60 minutes.

A two-pack type thermosetting resin composition (Optomer SS-6688, product of Japan Synthetic Rubber Co., Ltd.) was then applied by spin coating onto the colored base to give a coating thickness of 1 μm, and prebaked at 90° C. for 30 minutes, thereby forming a protective layer 6. The thus-formed protective layer 6 was further subjected to a heat treatment at 200° C. for 60 minutes to set it, thereby producing a color filter for liquid crystals.

The color filter for liquid crystals thus produced was observed through a light microscope. As a result, defects such as color mixing, color irregularity and failure in coloring were not observed.

This color filter for liquid crystals was used to produce a TFT liquid crystal panel as illustrated in FIG. 11. The operation of this panel revealed that vivid color images were able to be displayed.

EXAMPLE 12:

Onto a glass base 1 on which black matrices 2 had been formed, a resin composition comprising 97 parts of an acrylic copolymer having the following composition:

methyl methacrylate 30 parts
phenoxyethyl methacrylate 60 parts
hydroxyethyl methacrylate 10 parts and 3 parts of triphenylsulfonium triflate dissolved in ethyl cellosolve was applied by spin coating to give a coating thickness of 2 μm, and prebaked at 90° C. for 20 minutes, thereby forming a resin layer 3.

Portions of the resin layer 3 to be colored were then subjected to patterned exposure in the form of stripes through the same photomask 4 as that used in Example 11. The thus-exposed resin layer was subjected to a heat treatment for 1 minute on a hot plate heated to 120° C., thereby forming color mixing-preventing walls 8. Using an ink-jet head 5, the exposed portions of the resin layer 3 were colored on the pattern of a stripe form with consecutive dots of dye inks of R, G and B colors. The inks thus applied were then dried at 90° C. for 5 minutes. The resin layer 3 was subsequently subjected to a heat treatment at 200° C. for 60 minutes to set it.

A two-pack type thermosetting resin composition (Optomer SS-6688, product of Japan Synthetic Rubber Co., Ltd.) was then applied by spin coating onto the colored base to give a coating thickness of 1 μm, and prebaked at 90° C. for 30 minutes, thereby forming a protective layer 6. The thus-formed protective layer 6 was then subjected to a heat treatment at 200° C. for 30 minutes to set it, thereby producing a color filter for liquid crystals.

The color filter for liquid crystals thus produced was observed through a light microscope. As a result, defects such as color mixing, color irregularity and failure in coloring were not observed.

This color filter for liquid crystals was used to produce a TFT liquid crystal panel as illustrated in FIG. 11. The operation of this panel revealed that vivid color images were able to be displayed.

EXAMPLE 13:

As illustrated in FIGS. 10A to 10E, methylphenylpolysilane was applied by spin coating onto a glass base 1 to give a coating thickness of 2 μm, and prebaked at 90° C. for 20 minutes, thereby forming a resin layer 3.

Portions of the resin layer 3 were then subjected to patterned exposure in the form of stripes through the same photomask 4 as that used in Example 11, thereby forming color mixing-preventing walls 8. Using an ink-jet head 5, the exposed portions of the resin layer 3 were colored on the pattern of a stripe form with consecutive dots of dye inks of R, G and B colors. The inks thus applied were then dried at 90° C. for 5 minutes. The resin layer 3 was subsequently subjected to a heat treatment at 200° C. for 60 minutes to set it.

A photo-setting resin composition comprising an epoxy-acrylate and a photo-induced initiator was then applied by spin coating onto the colored base to give a coating thickness of 1 μm, and prebaked at 90° C. for 30 minutes, thereby forming a protective layer 6. The thus-formed protective layer 6 was then wholly exposed to set it, thereby producing a color filter for liquid crystals.

The color filter for liquid crystals thus produced was united to a base on which black matrices had been formed on the side of a TFT base as illustrated in FIG. 12, and a liquid crystal compound was charged in a space between both bases, thereby producing a liquid crystal panel. The operation of this panel revealed that vivid color images were able to be displayed. In addition, defects such as color mixing, color irregularity and failure in coloring were not observed in this color filter.

The use of the production process of a color filter for liquid crystals according to the present invention permits the economical production of color filters for liquid crystals, which are free of defects such as color mixing, color irregularity and failure in coloring and hence high in reliability. This process is particularly useful in producing color filters with a colored pattern in the form of stripes.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A process for producing a color filter by ejecting inks using an ink-jet system in the form of stripes, which comprises the steps of:

(1) forming a black matrices having a plurality of light transmitting areas on the base;

(2) forming a layer of a resin composition, the wettability by ink and/or the ink absorptivity of which is lowered at its light-exposed portions by a light irradiation treatment or light irradiation and heat treatment, on the base and the black matrices, (3) subjecting the resin layer to patterned exposure in the form of stripes to make color mixing-preventing wall;

(4) ejecting ink using the ink-jet system to color unexposed portions of the resin layer so as to cover the plurality of light transmitting areas between the color mixing-preventing walls in the same color; and (5) setting the colored portions of the resin layer by the irradiation and/or the heat treatment.

2. The process according to claim 1, wherein the width of the exposed portion of the resin layer formed on the base is narrower than that of a portion to be screened from light by the light-screening area.

3. The process according to claim 1, wherein an initial contact angle formed between each of the inks and the resin of the unexposed portions is 60° or lower.

4. The process according to claim 1, wherein an initial contact angle formed between each of the inks and the resin of the unexposed portions is 50° or lower.

5. A process for producing a color filter by ejecting inks using an ink-jet system in the form of stripes, which comprises the steps of:

(1) forming a black matrices having a plurality of light transmitting areas on the base;

(2) forming a layer of a resin composition, the wettability by ink and/or the ink absorptivity of which is improved at its light-exposed portions by a light irradiation treatment or light irradiation and heat treatment, on the base and the black matrices, (3) subjecting the resin layer to patterned exposure in the form of stripes to make color mixing-preventing wall;

(4) ejecting ink using the ink-jet system to color the exposed portions of the resin layer so as to cover the plurality of light transmitting areas between the color mixing-preventing walls in the same color; and (5) setting the colored portions of the resin layer by the heat treatment.

6. The process according to claim 5, wherein the width of the exposed portion of the resin layer formed on the base is wider than that of an aperture defined by the light-screening areas.

7. The process according to claim 5, wherein an initial contact angle formed between each of the inks and the resin of the exposed portions is 60° or lower.

8. The process according to claim 5, wherein an initial contact angle formed between each of the inks and the resin of the exposed portions is 50° or lower.

9. The process according to claim 1 or 5, which further comprises forming a protective layer on the resin layer having been set.

10. The process according to claim 1 or 5, wherein the surface tension of each of the inks falls within a range of from 20 to 60 dyne/cm.

11. The process according to claim 1 or 5, wherein the surface tension of each of the inks falls within a range of from 24 to 55 dyne/cm.

12. The process according to claim 1 or 5, wherein the surface tension of each of the inks falls within a range of from 28 to 50 dyne/cm.

13. A color filter produced by the process according to claim 1 or 5.

* * * * *

UNITED STATES PATENT AND TRADEMARK OFFICE
CERTIFICATE OF CORRECTION

PATENT NO.    : 5,948,576

DATED         : September 7, 1999

INVENTOR(S)   : KATSUHIRO SHIROTA ET AL.

It is certified that error appears in the above-identified patent and that said Letters Patent is hereby corrected as shown below:

On the title page:

AT [56] REFERENCES CITED

FOREIGN PATENT DOCUMENTS

"01217302" should read --1-217302--;
"01217320" should read --1-217320--;
"02228605" should read --2-228605--;
"03010220" should read --3-010220--;
"04123005" should read --4-123005--;
"04317007" should read --4-317007--;
"04349401" should read --4-349401--;
"05142407" should read --5-142407--;
"05173010" should read --5-173010--;
"05241012" should read --5-241012--; and
"05288913" should read --5-288913--.

COLUMN 4

Line 23, "views" should be deleted.

COLUMN 8

Line 30, "FIG. 5 illustrates." should read --FIG. 5.--.

UNITED STATES PATENT AND TRADEMARK OFFICE
CERTIFICATE OF CORRECTION

PATENT NO.    : 5,948,576
DATED         : September 7, 1999
INVENTOR(S)   : KATSUHIRO SHIROTA ET AL.

It is certified that error appears in the above-identified patent and that said Letters Patent is hereby corrected as shown below:

COLUMN 9

Line 52, "exemplifies" should read --exemplify--.

COLUMN 10

Line 21, "1" should be deleted; and
Line 42, "needed" should read --needed.--.

COLUMN 12

Line 54, "definition" should read --definition.--.

COLUMN 13

Line 34, "definition" should read --definition.--.

COLUMN 17

Line 50, "is" should read --are--; and
Line 64, "a" (first occurrence) should be deleted.

UNITED STATES PATENT AND TRADEMARK OFFICE
CERTIFICATE OF CORRECTION

PATENT NO.   : 5,948,576
DATED        : September 7, 1999
INVENTOR(S)  : KATSUHIRO SHIROTA ET AL.

It is certified that error appears in the above-identified patent and that said Letters Patent is hereby corrected as shown below:

COLUMN 18

Line 26, "a" (first occurrence) should be deleted.

Signed and Sealed this

Eleventh Day of July, 2000

Attest:

Q. TODD DICKINSON

Attesting Officer            Director of Patents and Trademarks